United States Patent Office 2,997,413
Patented Aug. 22, 1961

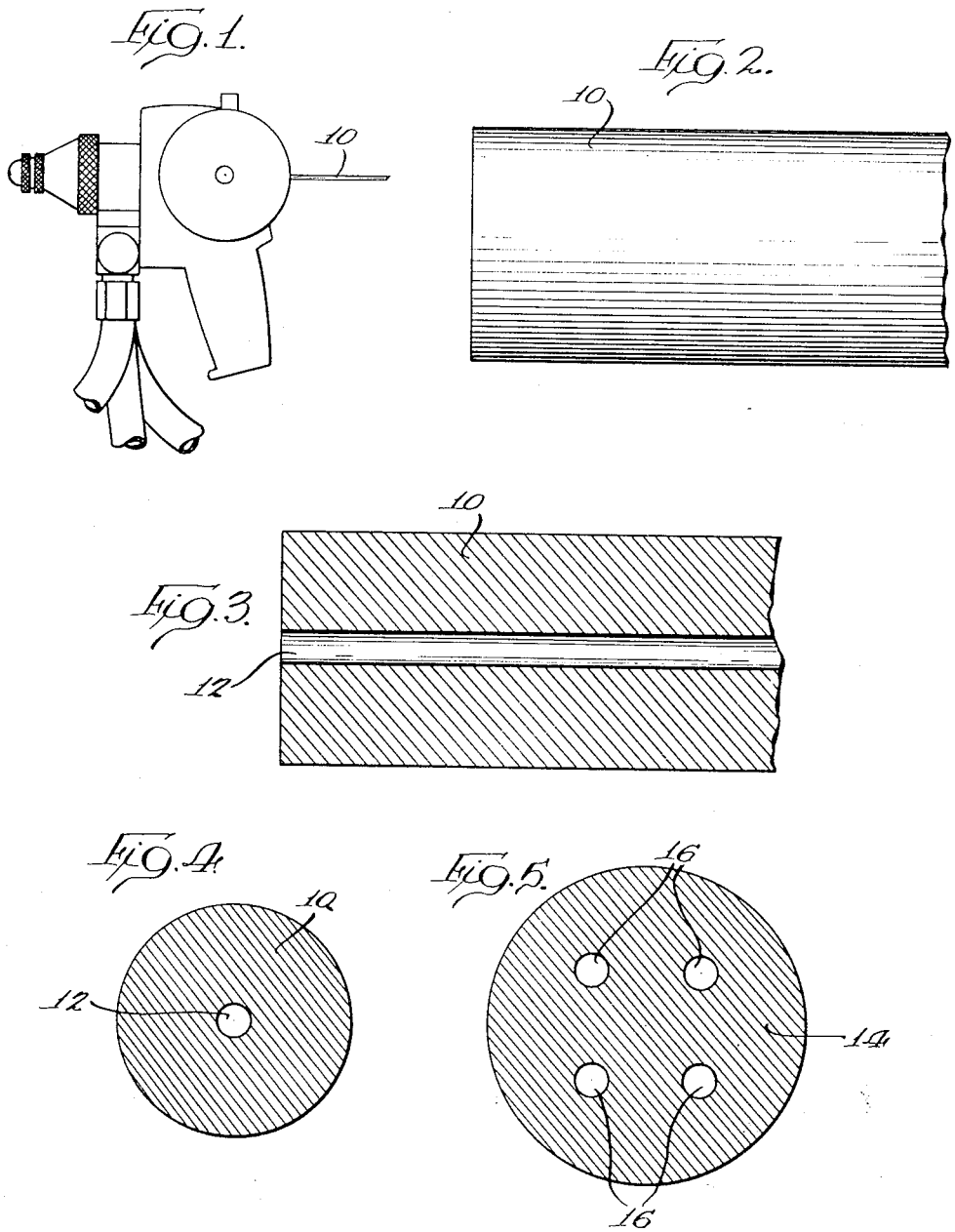

2,997,413
METAL OXIDE FLAME SPRAY STICK
Harold C. Wagner, St. Joseph, Mich., assignor to Laboratory Equipment Corporation, St. Joseph, Mich., a corporation of Michigan
Filed Nov. 15, 1960, Ser. No. 69,460
5 Claims. (Cl. 154—43)

The present invention relates to the art of flame spraying of highly refractory metal oxides and similar materials to form coatings, and is a continuation-in-part of my earlier application Serial No. 19,965, filed April 4, 1960, for Metal Oxide Flame Spray Stick, now abandoned. Zirconia (zirconium oxide) and alumina (aluminum oxide) are examples of such materials. There are others, but they need no individual treatment, since the problem to be discussed applies to all such materials, and the present invention, which greatly facilitates such processing, is of general application.

One of the objects of the present invention is to provide refractory material to be melted and flame sprayed in a novel form which permits a much more rapid melting and application of the substance than has heretofore been feasible.

A related object is to provide the refractory substance to be melted and sprayed in an improved form such that the common difficulty known as "spitting" is largely inhibited even though application rates are high.

Yet another object is to provide an improved flame spray metal oxide stick which can be melted and spray applied more rapidly and evenly than sticks heretofore used.

Other objects and advantages will becomes apparent from the following description of a preferred embodiment of my invention which is illustrated in the accompanying drawings.

In the drawings in which similar characters of reference refer to similar parts throughout the several views:

FIG. 1 is a diagrammatic side view of one common type of flame spray gun which is capable of making use of refractory material formed according to teachings of the present invention;

FIG. 2 is a side view of a typical refractory metal oxide stick which incorporates features of this invention;

FIG. 3 is a longitudinal medial sectional view thereof;

FIG. 4 is a transverse sectional view thereof; and

FIG. 5 is a transverse sectional view similar to FIG. 4, but showing an alternative form the invention may take.

For a number of years, flame spray guns have been available which were so arranged that a metal wire or rod could be mechanically fed continuously into a cluster of oxyacetylene flames such that the wire or rod was progressively melted, the melted particles then being atomized by an air blast and projected against the surface of an object where they solidify and form a coating. With such equipment, a layer of the melted and sprayed metal can be built up to almost any desired thickness.

More recently, equipment of this character has been adapted to the purpose of melting and atomizing highly refractory metal oxides and similar materials so as to form coatings of these useful substances which have very high melting temperatures, high dielectric properties, and excellent resistance to abrasion among other attributes.

Equipment for flame spraying metal oxides may feed the oxide into the flame in powder form or the oxide material may be preformed into a sintered or cemented stick which is fed into the flame in the same manner as the metal rods previously mentioned, excepting that the feed rate is slower. Of the processes available for flame spraying of oxides, probably the most convenient within its limitations is the arrangement which uses sintered sticks of the oxides. These sticks usually are about ⅛ to ¼ inch in diameter, but may be somewhat larger, and several inches long (whatever is convenient). One such apparatus and process is disclosed in the specification and drawings of Patent No. 2,707,691, in the name of William M. Wheildon, Jr., issued May 5, 1955.

One of the problems associated with flame spraying of oxides, when the oxide is in the form of a sintered stick, is that the flow of melted material usually is not even. It tends to melt and separate from the end of the stick in such manner as to form occasional gobs, and this produces a rough coating. This effect is commonly known in the art as spitting, and for some types of products the uneven results cannot be tolerated. One cure for the difficulty is to slow down the rate of stick feed. This, of course results in slow application rates, high labor, acetylene, oxygen and machine rate costs and overall inefficiency.

When oxide sticks are made according to the present invention, application rates may be increased so as to be as much as several times the rate possible with conventional sticks, without spitting or other undesirable effects, even though the same flame spray apparatus is used with both kinds of sticks and the rate of fuel and oxygen consumption is the same in both cases. This improvement, as is apparent, is extremely worthwhile and will be discussed in greater detail presently.

In the course of my investigation to determine the cause of spitting and to improve the situation, it became apparent to me that the difficulty probably was caused by some effect which included the fact that the end of the oxide stick fed into the flame cluster was heated to a very high temperature extremely rapidly and thus was subjected to high thermal shock. Probably this shock causes spalling in the stick just behind the portion being liquefied. The result is that a particle of liquid oxide is blown off the end of the stick with a rather large particle of partially melted material attached thereto and that composite particles such as this resulted in the rough, uneven surface.

By using a lower feed rate for the stick, the stick melts at a position less advanced in the flame so that there is less therma lshock behind the completely melted portion. Also, possibly if partially melted particles break off the stick in this less advanced position, they may be additionally melted in passing through the remaining portion of the flame. In any event, whether this theory is correct or not (it is very difficult to determine precisely what happens at the instant of melting and atomization) by proceeding upon this assumption I was able to devise the oxide stick which forms the subject matter of this invention.

From the drawings it will be apparent that the oxide stick is prepared in the form of a very thick wall, small bore tube, the wall portion being indicated at 10 and the bore at 12. This tube may have the same outside diameter as sticks now in use (⅛" to ¼" for example) and the same length. I have found that with zirconium oxide (ZrO₂) not much practical improvement results if this bore is less than .010" diameter and that there is progressive improvement as the diameter becomes larger up to about .030". This figure of .030" is not critical, but there is not any apparent advantage in having the bore larger, and of course the larger the bore the less the material per unit of length for a rod of any particular external diameter. If the bore becomes too large, there are special disadvantages associated with certain materials as will appear presently. Since a bore of .030" appears to be about optimum,, and since the disadvantages of being slightly above this size are minor, it is convenient as a practical matter to make the rods or sticks with a somewhat larger passage, up to .040" for instance. By using this practical approach, shrinkage which takes place between the extruded size and the final size need not be predicted so precisely, and die wear, which causes the bore to become progressively smaller with successive batches of sticks, is of little consequence.

A typical mix for producing zirconium oxide sticks may be made of:

ZrO₂ minus 325 mesh (44 micron)____ 100 parts.
Organic binders_____ 1 to 5 parts.
Water_____ About 20 parts.

The organic binders may be any of several well known materials which are used as temporary binders to give the material wet strength and which burn out during firing. If it is desired to have stronger sticks which will withstand rougher handling, from ¼ to 1 part of an inorganic binder—such as clay or silicic acid—may be added to the above.

Such a mix is extruded, dried, and fired to sintering temperature (somewhere between cone 20 and 40, for instance). Whatever temperature is satisfactory with a particular material or mix when it is made into ordinary solid sticks will be satisfactory.

Comparison tests between flame spray zirconium oxide sticks made in the usual solid form and sticks made according to the present invention gave the following typical results. In each case the mix was as given above, and the firing temperatures were identical. Both kinds of sticks had an outside diameter of 3/16" and were otherwise identical, excepting that those made according to this invention had a central passage or bore of .030". With the solid sticks being fed through the flame spray gun, the feed rate was increased slowly until an uneven, rough coating started to form. The feed rate was then reduced slightly until the coating produced was smooth and even. Under these conditions, the zirconium oxide was being applied at a maximum rate of 2.89 grams per minute. Under identical conditions, using the same flame spray gun, but using the sticks with the .030" passage, the maximum rate of application of a smooth even coating was 7.85 grams per minute. Thus, use of the passage through the center increased the rate of satisfactory application of the coating by about 2.7 times.

Relatively recently, there has been an attempt to overcome the difficulty set out above by using oxide particles of very large size, thus producing a highly porous stick. Such porous sticks are now commercially available and were subjected by me to the test procedure outlined above. It was found that under the conditions set forth, where the stick of the present invention had a maximum application rate of 7.85 grams per minute, these porous sticks had a maximum application rate of 5.27 grams per minute. These and other tests indicate that the hollow sticks are clearly superior to the porous sticks, and they have the distinct advantage of being formed of fine material.

The advantages associated with using fine material instead of coarse material are, among others, that the sticks formed of fine material are easier to fabricate (the damp, fine material holds together better and produces much less die wear, and the green strength is better). Also, sticks made of fine material, even with the central passage, are stronger for any particular firing temperature than coarse material sticks without the passage. Fine material sticks will, therefore, withstand rougher handling. Additionally, fine material (325 mesh) is more readily available from more sources than is coarse material.

If desired, the present invention may be applied to sticks made of coarse zirconia, although for the reasons given I prefer to use the fine material.

In another test, using 1/8" sticks of zirconia, solid sticks formed a smooth coating at a feed rate of 1.78 inches per minute, but produced spitting when the rate was increased to 2.15 inches per minute. Using 1/8" sticks of zirconia with a central passage having a diameter of .040", smooth coatings were formed at a rate of 9.2 inches per minute. Allowing for the less material in the tubing than in the solid rod, this gives an increase in rate, on a weight basis, of 4.33 times for the sticks formed according to this invention.

Although the specific examples given above relate to sticks formed of zirconia, repeated tests make it clear that the principles apply to other refractory materials which comprise this class of substances. With almost all metal oxides, no trouble is encountered by the passage through the stick becoming plugged at a position back from the melting zone in such manner as to cause the stick to react as though it were solid. This is probably due to the fact that there is a mild flow of air through the passage toward the melting zone which tends to keep the passage clear. Also, and more importantly, it appears that the melted refractory is sufficiently viscous to prevent its moving rearwardly through the bore.

Some slight trouble of this type is sometimes encountered, however, when the refractory in the melted state has a rather low viscosity. Aluminum oxide is a low viscosity material of this type and gives the most difficulty. When the sticks are composed of this substance, the bore should not be so large as to permit melted alumina to flash back and plug the bore such that the sticks subsequently behave in the manner of solid rods. With even larger bore sizes, an occasional particle may flash back all the way through the tube and endanger the operator.

With these limitations in mind, it is suggested that, when the sticks are essentially of alumina, the bore diameter be within the range of .010" to less than .030". Optimum for alumina from a practical manufacturing standpoint, considering flash back, appears to be about .020".

Specific examples of alumina sticks and test results thereon follow.

The sticks were hydraulically extruded from a mix comprised of:

| | Parts |
|---|---|
| Al₂O₃—minus 60 mesh | 70 |
| Al₂O₃—minus 325 mesh | 30 |
| E. P. Kaolin (clay) | 1 |
| Organic binders | 1 to 5 |
| Water | 18 |

The small amount of clay was added to give the desired fired strength for handling. Die size was chosen so as to produce sticks having an outside diameter of 1/8" or 3/16" and an inside diameter of .020" or .010". 3/16" sticks having a bore of .020" produced a smooth surface when fed at a rate of 9.13 grams per minute. Sticks having the same outside diameter and a bore of .010" gave a smooth surface when sprayed at a maximum rate of 7.96 grams per minute, whereas the maximum rate for solid 3/16" sticks was 6.85 grams per minute. All sticks were of the above composition and all were fired to cone 20 (about 2800° F.).

Additives in the above mix which would have the effect of increasing the viscosity of molten alumina or which would broaden its melting range would permit the use of a larger bore without danger of flashback and thus increase the rate at which the material could be fed without producing a rough coating. Even without such additives, it is apparent that a bore of only .010" has a useful effect and that the effect is better when the hole diameter measures .020". It is still better with larger bores, but, as explained, plugging becomes a problem.

The reason for incorporating the coarse material in the above alumina mix is that it seems to inhibit plugging to some extent, and therefore permits the use of a somewhat larger bore. Tests with all fine alumina (325 mesh) indicated, however, that application rates are as good as when coarse material is used, but as stated previously, the bore is more easily plugged. It is believed, therefore, that with the use of viscosity increasing, or melting range extending additives, all fine material can be used to advantage, thereby having the advantages of a stronger, more easily fabricated stick, while simultaneously maintaining the increased application rate of a larger passage (of the order of .030″).

In summary, therefore, as compared with a solid stick, a stick with a central passage or bore gives higher application rates before a rough surface is produced. Not much advantage from a practical standpoint results, however, if the passage diameter is less than .010″. With an increasingly larger passage, the improvement is progressive until a passage diameter of about .030″ is reached. Above this size no practical improvement is noticed, and ordinarily no important disadvantage is encountered until the passage is considerably larger than this. Therefore, ordinarily a passage somewhat larger than .030″ is suggested in order to obtain maximum application rates without manufacturing difficulties.

Although the above is the general rule, difficulty is encountered with plugging of large passages when the substance has a quite low molten viscosity. When this difficulty is apparent, the passage size should be reduced to less than optimum (from the standpoint of fast application rates) until the difficulty with plugging disappears or at least is reduced to an acceptable level. In other words, a higher application rate may be had if occasional plugging can be accepted than can be had if no plugging at all can be tolerated. It appears that of the refractory substances which are of practical importance, so far as flame spraying is concerned, only aluminum oxide gives this difficulty to any important degree. For alumina sticks, a bore of .020″ is about optimum.

For most substances, fine particle size is recommended, since large particles appear to confer no special advantage to hollow sticks and fine particles are easier to handle and result in lower cost and stronger sticks. This incorporation of some large particles in alumina sticks, however, appears to inhibit plugging to an extent, and such particles are therefore of some advantage in this special case.

All of the above remarks are directed specifically to sintered sticks. It has been found, however, that the invention also is of advantage in sticks which are made by cementing the metal oxide particles together with an organic binder. With most oxides, cemented sticks have disadvantages as compared with sintered sticks and cemented sticks are, therefore, not generally used. I have found, however, that cemented alumina sticks give high application rates, smooth coatings, and freedom from plugging of the central bore, and are, therefore, generally to be preferred, excepting that the organic binders so far used by me produce considerable odor while burning or vaporizing and cemented sticks are to this extent somewhat objectionable. An excellent binder for alumina which exhibits these characteristics, for example, is phenol-formaldehyde condensation resin. It should be appreciated, however, that for some purposes, cemented sticks have uses, and such uses may increase, and that the present invention has the same effect upon the performance of cemented sticks as it has upon sintered sticks.

The size of the passage appears not to be appreciably influenced by the outside diameter of the stick. That is, the same passage diameter is used with ⅛″ sticks as with ³⁄₁₆″ or ¼″ sticks.

I have found, however, that with large diameter sticks (of the order of about ¼″ and larger) some improvement is gained by using several passages as is shown in FIG. 5 for instance. Here the stick 14 is of any of the materials specified above, and the four passages 16 therethrough have the same diameter as the passage 12. Several spaced apart passages appear to contribute two advantages. One of these is that the thickness of the material between any two passages or between the passages and the periphery of the stick is not as great as the distance between a single passage and the periphery. The other advantage is that if one of the passages becomes plugged, the change in the application characteristics is much less pronounced than if a single passage becomes plugged.

Because of the statistical improbability that more than one or two passages will become plugged, even at somewhat higher application rates than would be considered normal with a single hole, it is possible to gain some practical advantage in application rates by providing several holes through the stick, particularly when the stick is of relatively large diameter.

Considering the various aspects of the problem, including manufacturing difficulties, my preference is to use a single hole through ⅛″ and ³⁄₁₆″ sticks and to use four holes through ¼″ and larger sticks. The number and arrangement of the holes appear not to be particularly critical, however, since ¼″ sticks made with three, four, five, or six approximately evenly spaced holes perform about the same, excepting that the presence of more holes reduces the amount of material in the stick and thus increases the feed rate. The use of two holes results in a ¼″ stick which appears to be slightly inferior to sticks having three or more holes, although it is superior to a ¼″ stick having only one hole.

From the above description of my invention, it will be appreciated that variations may be made without departing from the spirit and scope of the invention, and that the scope of the invention is to be determined from the scope of the following claims.

Having described my invention, what I claim as new and useful and desire to secure by Letters Patent is:

1. A fine grained, dense, and physically strong, flame spraying stick adapted for rapid melting and spraying without spitting, comprised essentially of sintered particles of a refractory metal oxide, said stick having the form of a long, thin cylinder with a central passage extending longitudinally therethrough from end to end, the passage having a diameter lying substantially within the range of two one-hundredths to four one-hundredths of an inch, the external diameter of the stick lying substantially within the range of one-eighth to substantially one-fourth of an inch, and substantially all of the oxide particles in the stick being no larger than fifty microns in diameter.

2. A fine grained, dense, and physically strong, flame spraying stick adapted for rapid melting and spraying without spitting comprised essentially of sintered, fine particles of a refractory metal oxide, said stick having the form of a long, thin cylinder with a central passage extending longitudinally therethrough from end to end, the passage having a diameter lying substantially within the range of one one-hundredths to four one-hundredths of an inch, and the external diameter of the stick lying substantially within the range of one-eighth to substantially one-fourth of an inch.

3. A flame spraying stick comprised essentially of bonded particles of a refractory metal oxide, said stick having the form of a long, thin cylinder with at least one passage extending longitudinally therethrough from end to end, the passage having a minimum diameter of one one-hundredth inch, and a maximum diameter below that at which the molten oxide flows into and plugs the passage, and the external diameter of the stick lying substantially within the range of one-eighth to substantially one-fourth of an inch.

4. A long, thin flame spraying stick comprised essentially of sintered particles of a refractory metal oxide, said stick having at least one unobstructed passage extending through the stick longitudinally from end to end, said passage having a minimum diameter of one one-hundredth inch and a maximum diameter of substantially four one-hundredths of an inch.

5. A dense and physically strong flame spraying stick comprised essentially of sintered particles of a refractory metal oxide, said stick having at least one unobstructed passage extending through the stick longitudinally from end to end, said passage having a diameter within the range in which the passage does not become obstructed by molten oxide when one end of the stick is in molten condition and the remainder of the stick is in solid condition.

References Cited in the file of this patent
UNITED STATES PATENTS

| | | |
|---|---|---|
| 2,707,691 | Wheildon | May 3, 1955 |
| 2,963,570 | Rieppel | Dec. 6, 1960 |